United States Patent
Fujita et al.

(10) Patent No.: US 6,411,055 B1
(45) Date of Patent: Jun. 25, 2002

(54) ROBOT SYSTEM

(75) Inventors: Masahiro Fujita; Kazufumi Oyama, both of Saitama; Takashi Yamamoto, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/197,332

(22) Filed: Nov. 20, 1998

(30) Foreign Application Priority Data

Nov. 30, 1997 (JP) .............................. 9-345841

(51) Int. Cl.⁷ ................................. B25J 5/00

(52) U.S. Cl. ............................ 318/568.12; 318/568.11; 700/12; 700/245; 700/249

(58) Field of Search ....................... 318/568.11, 568.12; 395/80, 82, 84, 97; 364/513, 200; 700/12, 245, 249

(56) References Cited

U.S. PATENT DOCUMENTS

| | | | | |
|---|---|---|---|---|
| 4,467,436 A | * | 8/1984 | Chance et al. | 364/513 |
| 4,495,567 A | * | 1/1985 | Treen | 364/200 |
| 4,495,568 A | | 1/1985 | Gilbert et al. | 364/200 |
| 4,578,764 A | | 3/1986 | Hutchins et al. | 364/513 |
| 4,586,151 A | | 4/1986 | Boute | 364/513 |
| 4,689,755 A | * | 8/1987 | Buote | 364/513 |
| 4,937,759 A | * | 6/1990 | Vold | 364/513 |
| 4,990,839 A | * | 2/1991 | Schonlau | 318/568.1 |
| 5,241,875 A | | 9/1993 | Kochanneck | |
| 5,238,718 A | * | 6/1995 | Matsumaru | 395/80 |
| 5,428,713 A | | 6/1995 | Matsumaru | 395/80 |
| 5,657,245 A | * | 8/1997 | Hecht et al. | 364/505 |
| 5,812,432 A | * | 9/1998 | Takizawa et al. | 364/578 |

OTHER PUBLICATIONS

Matsumaru, "Recognition of constitution/Configuration and Workability Judgment for the Modular Manipulator System, TOMMS", Proceedings of the 1996 IEEE IECON. 22nd International Conference on Industrial Electronics, Control, and Instrumentation (Cat. No. 96CH35830), Proceedings of the 1996 IEEE IECON 22nd International Conference on Industrial Electronics, Control, and I, pp 493–500 vol. 1, XP000696203.

Patent Abstracts of Japan, vol. 011, No. 188, Jun. 17, 1987 & JP62–015058, Jan. 23, 1987.

Patent Abstracts of Japan, vol. 017, No. 308, Jun. 11, 1993 & JP05–027961, Feb. 5, 1993.

* cited by examiner

*Primary Examiner*—Robert E. Nappi
*Assistant Examiner*—Rita Leykin
(74) *Attorney, Agent, or Firm*—Frommer Lawrence & Haug LLP; William S. Frommer; Joe H. Shallenburger

(57) ABSTRACT

A modular robot system is provided with memory means for memorizing task information concerning task of each component unit and the recognition means for recognizing the task of each component unit based on the task information of each component unit. Further, the modular robot system is provided with linkage condition detection means for detecting the linkage condition of each component unit, memory means for memorizing the linkage condition of each component unit every category, of which the configuration of robot system to be assembled is classified into multiple categories according to the linkage condition of each component unit, and judgment means for judging the category of the robot system to be assembled based on the linkage condition of each component unit detected by the linkage condition detection means and the linkage condition of each component unit every category memorized by the memory means.

11 Claims, 9 Drawing Sheets

FIG. 9A

Move_forward —— Forward_walking

Move_backward —— backward_walking stay —————— standing

Rest —————— sitting sleep —————— sleeping

FIG. 9B

Move_forward —————— forward

Move_backward —————— backward stay —————— stop

Rest —————— stop sleep —————— stop

ROBOT SYSTEM

BACKGROUND OF THE INVENTION

1. Field of the Invention

This invention relates to a robot system and more particularly, is suitably applied to a modular robot which is constructed by connecting multiple component units (parts).

2. Description of the Related Art

As this type of robot system, robot systems having various constructions have been proposed in the journals such as Japan Patent Laid Open No. 25858/72, Japan Patent Laid Open No. 205292/84, "Robot Models for Space Environment" (R. O. Ambrose and C. G. Ambrose, IEEE International Conference on R&A, 1995 pp.2113–2131), "The Concept and Construction of a Modular Robot System" (K. H. Wurst Proc of 16th ISIR, 1986, pp.37–44) and "Conceptual Design of a Modular Robot" (R. Cohen et.al Journal of Mechanical Design, 1992 vol. 114 pp.117–125).

Furthermore, according to "A Study on the Construction of Modular Manipulator, the Method of Design Recognition and Operable/Unoperable Judgment" (Takafumi Matsumaru et.al Journal of Japan Robotic Association, 1997 vol.15 No.3, pp.408–416), in the modular manipulator which can be constructed by connecting the joint module and link module freely, the method to automatically recognize its construction and to make it perform practical and useful operation immediately after it is assembled is disclosed.

However, all of these literatures are written supposing a manipulator (mechanical arm), so that it has caused problems in applying various methods disclosed in these literatures to the robot in which a component unit is branched off into two or more component units and connected.

In practice, in the robot system which can be assembled to various kinds of configurations by attaching various kinds of component units such as a head, arms, legs, and wheels to a body unit as desired condition, such as a four-foot walking type as shown in FIG. 1A, a two-foot walking type as shown in FIG. 1B, a vehicle type as shown in FIG. 1C, or a 2-wheel driven type as shown in FIG. 1D, although the robot is so constructed that it can automatically recognize the overall construction at the stage when it is assembled, the robot can not determine which unit will be used as "arm" and which unit will be used as "leg", or the robot is constructed as the two-foot walking type or four-foot walking type. Therefore, it is difficult for the robot to perform actions according to its configuration immediately after it is assembled.

Accordingly, unless otherwise these problems are solved, the robot can not perform actions corresponding to the configuration of the robot without conducting the work such as inputting programs corresponding to the configuration of the robot assembled, and the assembly work of the modular robot cannot be simplified.

SUMMARY OF THE RELATED ART

In view of the foregoing, an object of this invention is to provide a robot system in which the assembly work can be simplified.

The foregoing object and other objects of the invention have been achieved by the provision of a modular robot system which comprises memory means for memorizing task information on tasks of component units in respective component units and recognition means for reading out the task information from the memory means of each component unit and recognizing the task of the component unit based on the task information read out.

Therefore, in this robot system, even if the user does not give a task of each component unit, the robot itself can recognize the task of each component unit at the stage when it is assembled, so that the robot system in which the assembly work is simplified can be realized.

Furthermore, in the present invention, the modular robot system comprises linkage condition detection means for detecting the linkage condition of each component unit, memory means for memorizing the linkage condition of each component unit in every category, of which the configuration of robot system to be constructed is classified into multiple categories according to the linkage condition of each component unit, and judgment means for judging to which category the constructed robot system belongs based on the linkage condition of each component unit detected by the linkage condition detection means and the linkage condition of each component unit for each category memorized by the memory means.

Therefore, this robot system automatically recognizes its own configuration even if the user does not inform the robot system of its configuration and thus, the robot system in which the assembly work is simplified can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 9A and 9B are tables showing examples of conversion data in the four-foot walking type robot and the two-wheel driven robot.

DETAILED DESCRIPTION OF THE EMBODIMENT

Figure 2:
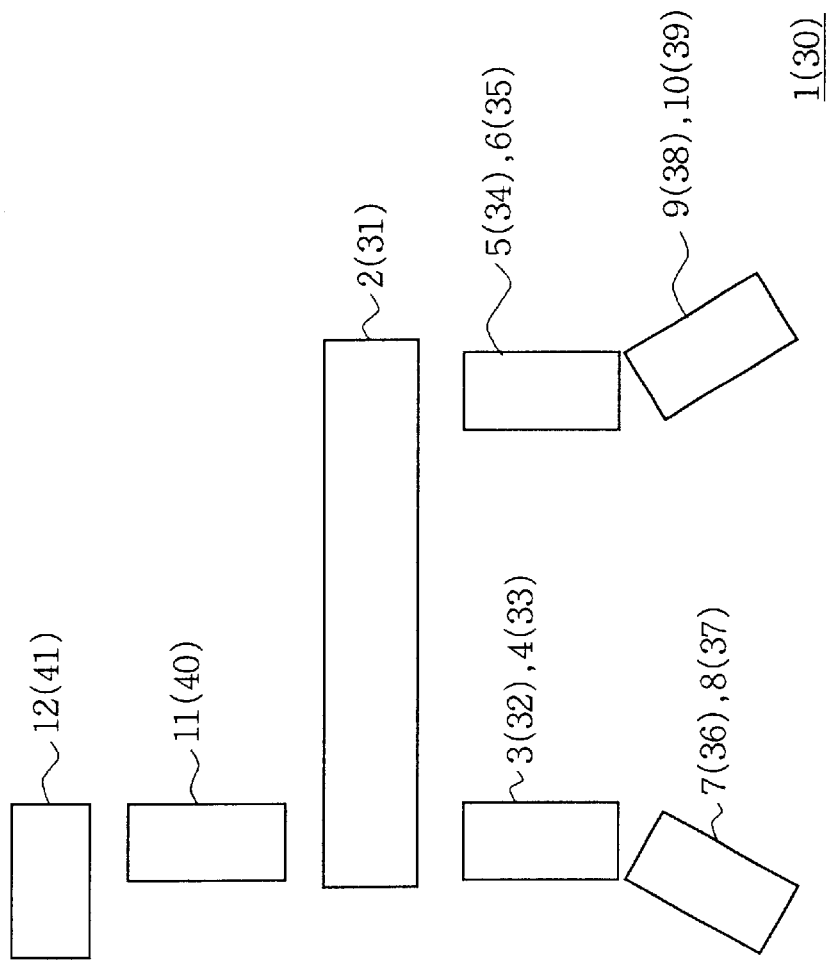
FIG. 2 is a conceptual diagram showing the configuration of a robot according to the present invention.

Preferred embodiments of this invention will be described with reference to the accompanying drawings:

(1) The First Embodiment (1-1) Robot Configuration according to the First Embodiment In FIG. 2, numeral 1 generally shows a modular robot according to the present invention, in which thigh units 3 to 6 and leg units 7 to 10 are connected removably to each corner at the front and back and right and left of a body unit 2 in order, and a neck unit 11 and a head unit 12 are removably connected to the center of the front end of the body unit 2 in order. The body unit 2, the thigh units 3 to 6, the leg units 7 to 10, the neck unit 11, and the head unit 12 are referred to as component units 2 to 12 in the following paragraphs.

Figure 3:
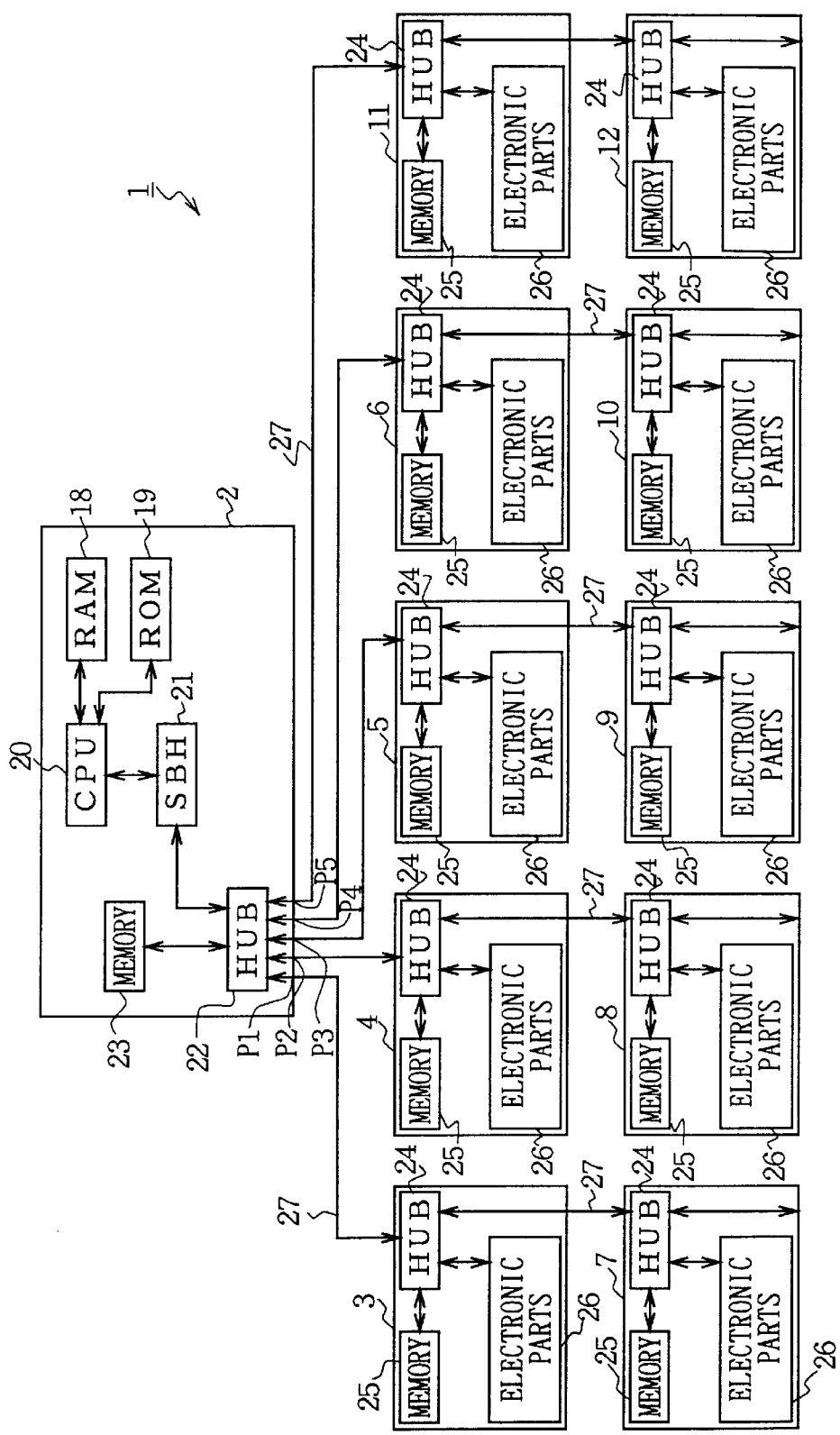
FIG. 3 is a block diagram showing the configuration of a robot according to the first embodiment.

In this case, as shown in FIG. 3, a central processing unit (CPU) 20 for controlling the overall operation of the robot 1, a serial bus host (SBH) 21 for controlling the serial bus described later, a distributor (HUB) 22, a memory 23, a random access memory (RAM) 18 and a read only memory (ROM) 19 in which a program for making the assembled robot 1 generate a variety of actions is stored are provided in the body unit 2.

Moreover, information on the shape, such as width and length of the body unit 2 (hereinafter, referred to as the geometry information), information necessary for describing the motion, such as the mass of the body unit 2, the rotation moments, the center of the rotation axis and the gravity of the body unit 2 (hereinafter, referred to as the motion information), and position information of link points P1 to P5 of the HUB 22 are stored in the memory 23.

On the other hand, an HUB 24, a memory 25, and necessary electronic parts 26 such as an actuator and a sensor are installed in each of component units 3 to 12 except for the body unit 2. The geometry information and the motion information of each of the component units 3 to 12 and the information on the function and characteristics of the electronic part 26 stored in each of the component units 3 to 12 (hereinafter, referred to as characteristic information) are stored in each memory 25.

Furthermore, each of the component units 2 to 12 has a connector (not shown) which is connected to the HUB 24 using a serial bus 27 such as IEEE1394 or universal serial bus (USB), provided in the component unit 2 to 12, at the connecting point to another component unit 2 to 12. These component units 2 to 12 are physically connected to each other in order to electrically connect the HUB 22 to HUB 24 of the component units 2 to 12 using the serial bus 27.

Accordingly, in this robot 1, under the condition in which the robot system is assembled as shown in FIGS. 2 and 3, the CPU 20 in the body unit 2 can read out the geometry information, the motion information and the characteristic information of the component units 2 to 12 from the memories 23 and 25 in the component units 2 to 12 successively through SBH 21 and HUB 22 of the body unit 2 and the HUB 24 of each of the component units 3 to 12, or can receive the output from the sensor of each of the component units 3 to 12, in order to control the actuator of each of the component units 3 to 12.

With this arrangement, in this robot 1, the CPU 20 can recognize the configuration of the robot 1, such as which component unit 3 to 6 is connected to which link position of the body unit 2, and which component unit 7 to 10 is connected to the component unit 3 to 6, based on the position information of each of the link points P1 to P5 of the HUB 22 stored in the memory 23 of the body unit 2 and the geometry information stored in the memory 23, 25 of each of the component units 2 to 12.

Moreover, in this robot 1, the CPU 20 can drive the actuator of each of the component units 3 to 12 to the desired condition, based on the motion information, and the characteristic information of the electronic part 26, which are stored in the memory 25 of each of the component units 3 to 12 except for the body unit 2, and the CPU 20 can also monitor the condition of each of the component units 3 to 12 at that time based on the output from the sensors of the component units 3 to 12.

In addition to the above configuration, in the case of this robot 1, information on tasks regarding such as "right front thigh", "left back shank", "neck", and "head" of the robot 1 (hereinafter, referred to as task information) is stored in the memory 23, 25 of each of the component units 2 to 12.

Therefore, in this robot 1, the CPU 20 can recognize the =task of each component unit 2 to 12 based on the task information. Thus, for example, when an operation command to drive the component units 2 to 12 having the predetermined task to the predetermined condition, such as "Lift up the right front leg", is given from the outside (or higher level program of inside), the CPU 20 can operate the specified component units 2 to 12 in the specified condition by controlling the actuators of the pertinent component units 2 to 12.

In practice, when the power is turned on under the condition in which the robot 1 is assembled, the CPU 20 reads out the program for generating various actions, which is stored in the ROM 19, and downloads the program into the RAM 18.

Then, the CPU 20 reads out the geometry information, motion information, characteristic information and task information on the component units 2 to 12, which are stored in the memories 23, 25, from the memory 23, 25 in each of the component units 2 to 12 successively through the SBH 21 and the HUB 22 of the body unit 2 and the HUB 24 of each of the component unit 3 to 12, in order to store these in the RAM 19. Then, the CPU 20 recognizes the configuration of the assembled robot 1 based on the geometry information of each of the component units 2 to 12 and recognizes the task of each of the component units 2 to 12 based on the task information of each of the component units 2 to 12.

Moreover, when an operation command to drive the component units 2 to 12 having the predetermined task to the predetermined condition, for example, "Lift up the right front shank", or "Drop the head", is given from the outside, the CPU 20 generates a control signal based on the program downloaded into the RAM 18 and the motion information and characteristic information of pertinent component units 3 to 12, which are stored in the RAM 18, and supplies the generated control signal to the actuators of the component unit 3 to 12.

With this arrangement, the CPU 20 can drive the actuators of the specified component units 3 to 12 in the specified conditions based on the control signal, and accordingly, it can drive the component units 3 to 12 in the specified condition.

(1-2) Operation and Effects of the First Embodiment

According to the foregoing construction, in this robot 1, the CPU 20 recognizes the task of each of the component units 3 to 12 based on the task information, which is stored in the memory 25 of each of the component units 3 to 12, and executes the operation corresponding to the operation command to be supplied from the outside, by driving the actuators of the component units 3 to 12 based on the recognition result.

Accordingly, in this robot 20, since it is unnecessary for the user to set the task of each of the component units 3 to 12 connected to the body unit 2 under the condition where the robot 20 is assembled (after assembling the robot, the user does not need to give the data concerning the task of each of the component units 3 to 12 to the CPU 20), the assembly work can be simplified.

According to the foregoing construction, the memory 24 in which the task information of the component unit 3 to 12 is recorded is provided in respective component units 3 to 12 and moreover, the CPU 20 recognizes the task of each of the component units 3 to 12 based on the task information, so that the CPU 20 can recognize the task of each of the component units 2 to 12 even if the user does not set the task of each of the component units 3 to 12. Thus, the robot capable of being simply assembled can be realized.

Figure 4:
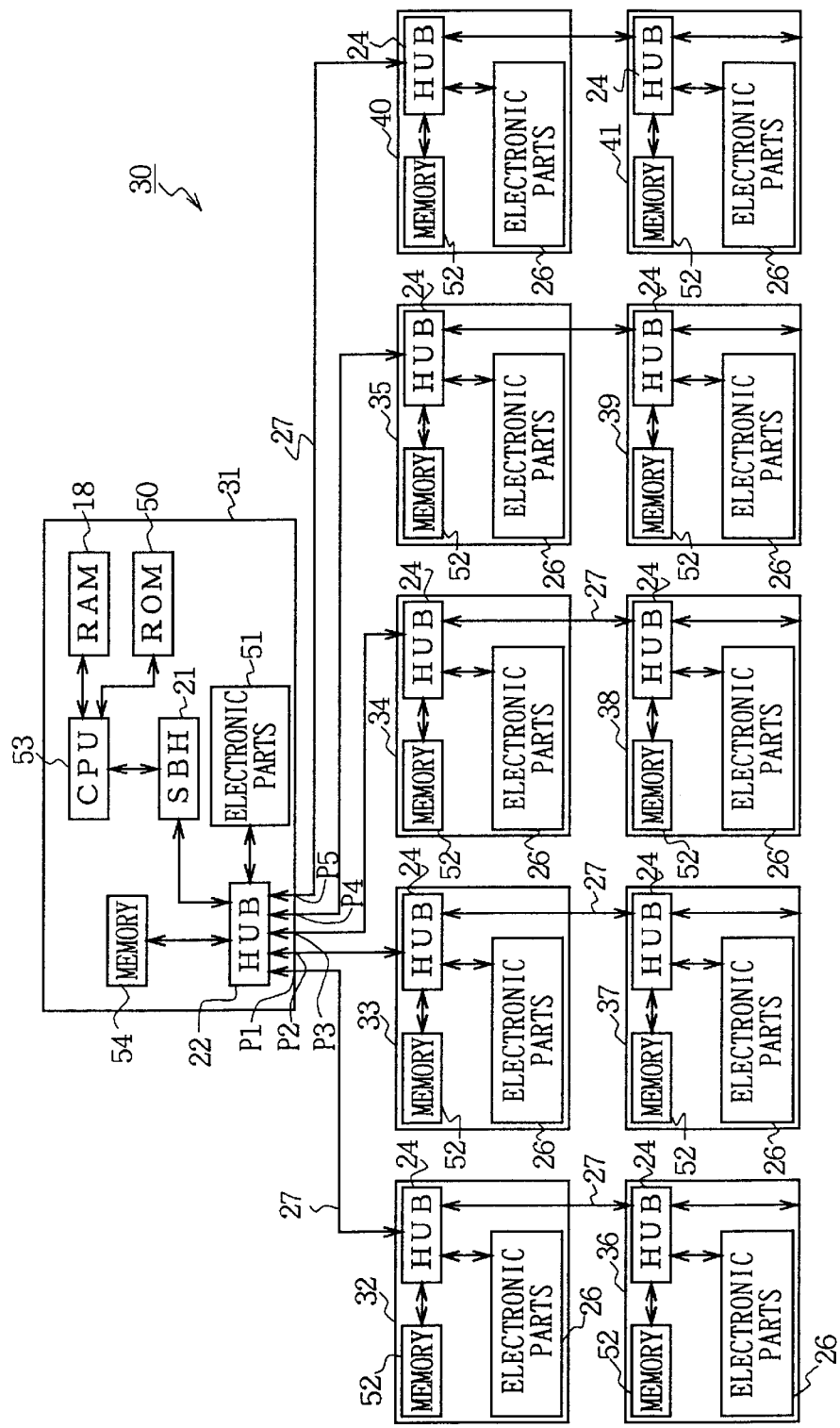
FIG. 4 is a block diagram showing the configuration of a robot according to the second embodiment.

(2) The Second Embodiment (2-1) Robot Configuration according to the Second Embodiment FIGS. 4 and 2, where the same reference numerals are applied to parts corresponding to FIG. 3, show the robot 30 according to the second embodiment. The robot 30 has the similar construction to that of the robot 1 of the first embodiment (FIGS. 2 and 3) except for the points: the program stored in the ROM 50 of the body unit 31 differs from the program stored in the ROM 19 (FIG. 3); electronic parts 51 including the gravity sensor are added to the inside of the body unit 31; and in the memories 54, 52 of the component units 31 to 41, the task information of the respective component units 31 to 41 are not stored but only the geometry information, the motion information, and the characteristic information on the respective component units 31 to 41 are stored.

Figures 5A, 5B, 5C:
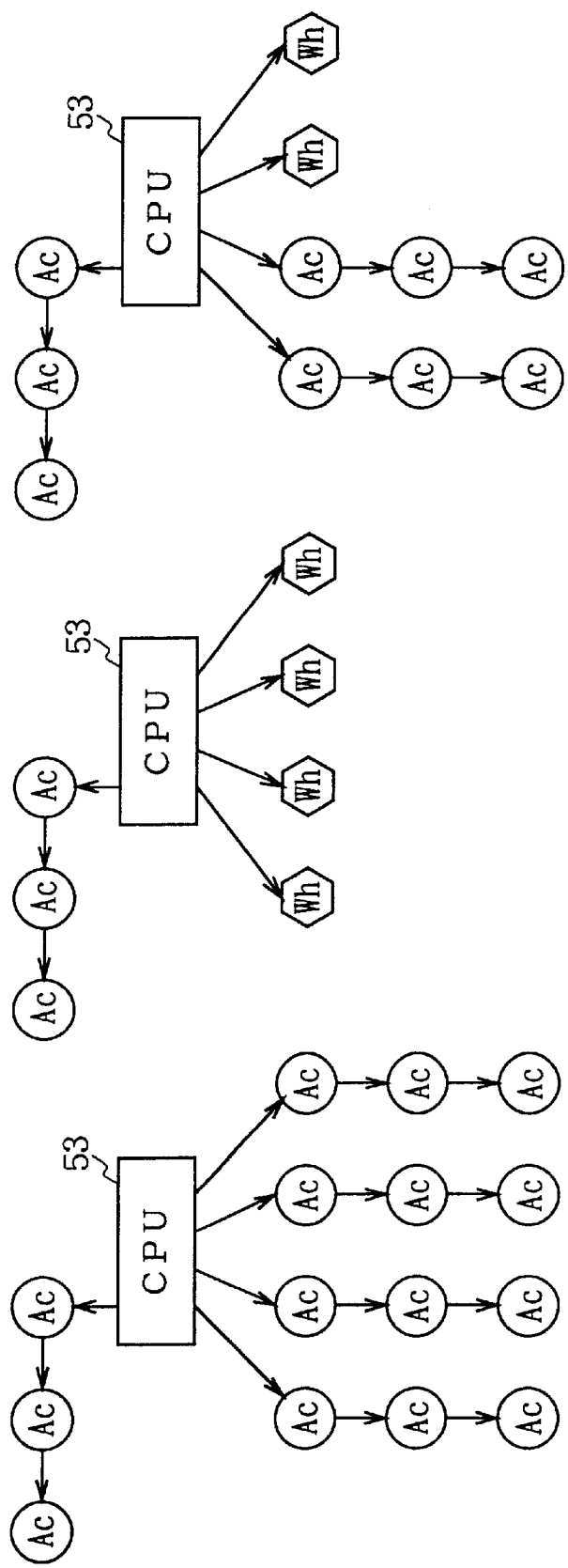
FIGS. 5A to 5C are conceptual diagrams showing various kinds of tree structures.

In this case, tree-structured data indicating the connecting relation between the CPU 53 and the actuator Ac and the wheel Wh, such as in which position and which order the actuator Ac and the wheel Wh are connected to the CPU 53 in a state where the robot 30 is assembled, as shown in FIGS. 5A to 5C, are stored in the ROM 50 of the body unit 31.

Figure 1A:
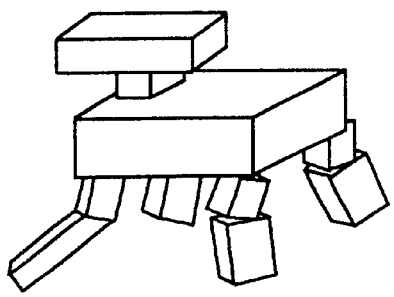
FIGS. 1A to 1D are brief linear perspective views explaining various configurations of modular robots.
Figure 1B:
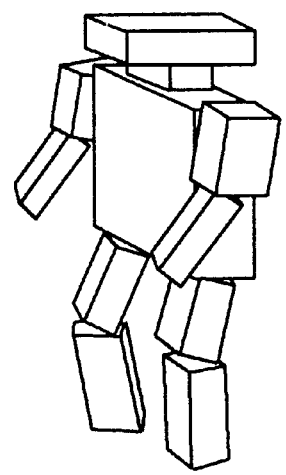
Figure 1C:
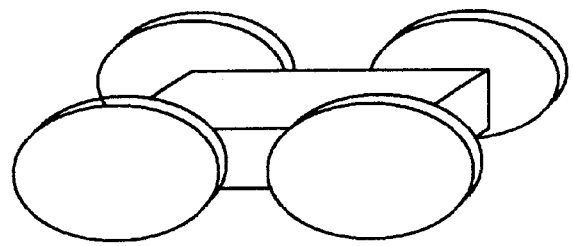
Figure 1D:
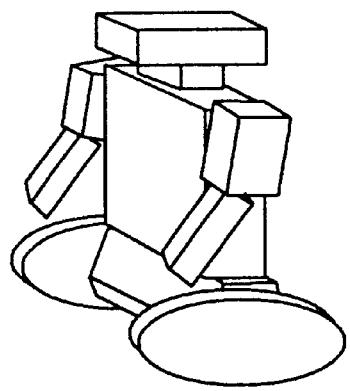

In practice, the configuration of the robot 30 can be classified into multiple categories according to these tree structures. For example, tree structures of robots having configurations like FIGS. 1A and 1B can be expressed as FIG. 5A, while the tree structure of the robot having the configuration like FIG. 1C is expressed as FIG. 5B and the tree structure of the robot having the configuration like FIG. 1D is expressed as FIG. 5C.

Moreover, in the ROM 50 of the body unit 31, the tree-structured data per every category in the case where the predicted configuration of the robot 30 to be constructed is classified into multiple categories according to the tree structure are stored. In this case, for example, even if the configurations have the same tree structure as shown in FIGS. 1A and 1B, the configurations are classified into different categories according to the position of robot 30 when the power source is turned on (such as in the case where the body unit 31 is positioned parallel to the vertical direction, the configuration is the two-foot walking type, and in the case where the body unit 31 is positioned orthogonal to the vertical direction, the configuration is the four-foot walking type).

Moreover, multiple programs to generate actions, such as which component unit 32 to 41 is recognized as "head", "foot", or "arm", etc., and how to act, corresponding to respective categories, are stored together with the tree-structured data of respective categories in the ROM 50.

Thus, in this robot 30, the CPU 53 of the body unit 31 can recognize the configuration of robot 30 assembled based on the geometry information stored in each of the memories 54 and 52 of component units 31 to 41, and can identify the category of the robot 30 based on the recognition result and the tree-structured data of each category stored in the ROM 50. Moreover, by drive-controlling the required component units 32 to 41 when required based on the judgment result and various programs for action of each category stored in the ROM 50, the CPU 53 can take action corresponding to the assembled configuration.

Practically, when the power is turned on in a state where the robot 30 is assembled, the CPU 53 of the body unit 31 reads out various programs stored in the ROM 50 and downloads the programs into the RAM 18.

Then, the CPU 53, reading out the geometry information from each of the memories 54, 52 of the component units 31 to 41 successively via the SBH 21 and the HAB 22, and the HUB 24 of each of the component units 32 to 41, detects the tree structure of the robot 30 assembled. Also, at this point, the CPU 53 detects the posture of the robot 30 at the time when the power is turned on, based on the output of the gravity sensor comprising the electronic parts 51 of the body unit 31.

Then, the CPU 53 identifies the category of the robot based on thus detected tree structure and posture of the robot 30, and selects the pertinent program based on the judgment result, and assigns the basic posture in that category for each condition based on the program. In practice, for example, if the robot is a four-foot robot, a state in which the body unit 31 is in a horizontal position with its feet stretched is assigned as the basic posture of "standing", and if it is two-wheel driven type, a state in which the body unit 31 is in a vertical position is assigned as the basic posture of "standing". Then, the CPU 53 controls the actuators in the required component units 32 to 41 when required, based on this program.

Accordingly, the CPU 53 drive-controls the component units 32 to 41 according to the respective programs, based on the configuration of the robot 30 assembled and the posture of the robot 30 at the time of turning the power on.

(2-2) Software Architecture according to the Second Embodiment

Here, FIG. 5 shows an architecture of software to be stored in the ROM 50 of the body unit 31.

Figure 6:
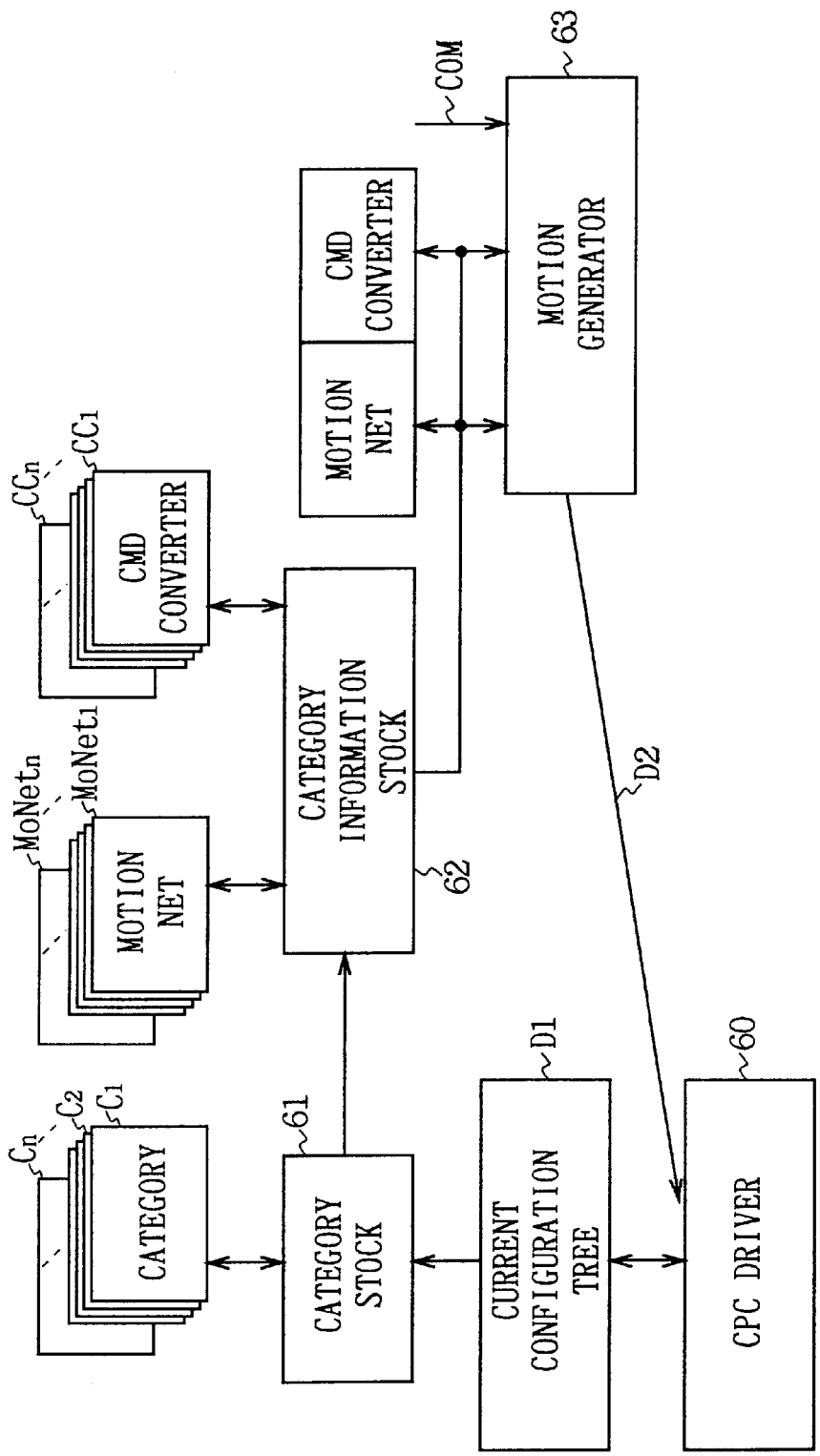
FIG. 6 is a conceptual diagram showing the software architecture according to the second embodiment.

In this FIG. 6, a configurational physical component (CPC) driver 60 is a program to initialize CPC devices such as the actuator of each of the component units 32 to 41 and to read and write data from/in the RAM 18 of the body unit 31, and holds the tree-structured data of the present robot 30 and the data regarding the posture of the robot 30 at power-on (hereinafter, these data are referred to as configuration data D1), which are detected by the CPU 53. And the configuration data D1 is supplied to a category stock 61.

The category stock 61 is a program to control the tree-structured data and the data indicating posture for each category registered in advance (hereinafter, these data are referred to as category-classified data $CD_1$ to $CD_n$), and by comparing these registered category-classified data $CD_1$ to $CD_n$ with the configuration data D1, identifies to which category the assembled robot 30 belongs and gives the judgment result to a category information stock 62.

The category information stock 62 is a program to control a previously registered program (hereinafter, referred to as motion network) $MoNet_1$ to $MoNet_n$ for the posture transition and the motion of the robot 30 in each category and the conversion data $CC_1$ to $CC_n$ for converting action commands COM given from the upper level program to the corresponding commands in each category, and selecting the corresponding motion network $MoNet_1$ to $MoNet_n$ and the conversion data $CC_1$ to $CC_n$ based on the judgment result by the category stock 61, supplies these to the motion generator 63.

The motion generator 63 is a program to form operation data, and as well as holding the motion network $MoNet_1$ to $MoNet_n$ and the conversion data $CC_1$ to $CC_n$ which are given from the category information stock 62, converts the action command COM to be given from the upper level program to a corresponding command based on the conversion data $CC_1$ to $CC_n$ and forms the corresponding operation data D2 based on the obtained command and the held motion network MoNet$_1$ to MoNet$_n$, and supplies these to the CPC driver 60.

Thus, in the robot 30, according to this CPC driver 60 the actuators in respective component blocks 32 to 41 are controlled by the CPU 53 and thus, the action corresponding to the action command COM to be given from the upper level program is conducted.

Figure 7:
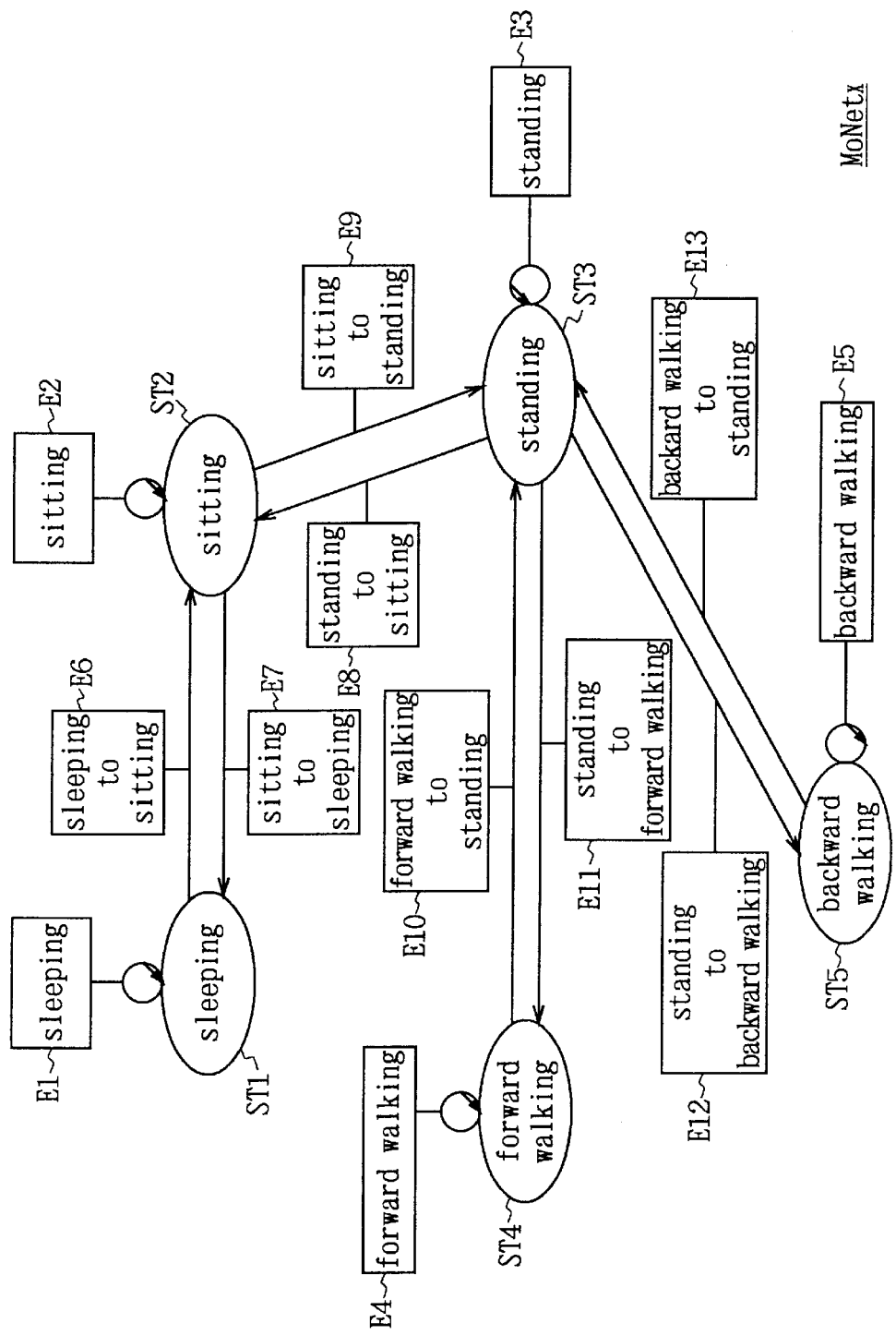
FIG. 7 is a conceptual diagram showing a motion network of a four-foot walking type robot.
Figure 8:
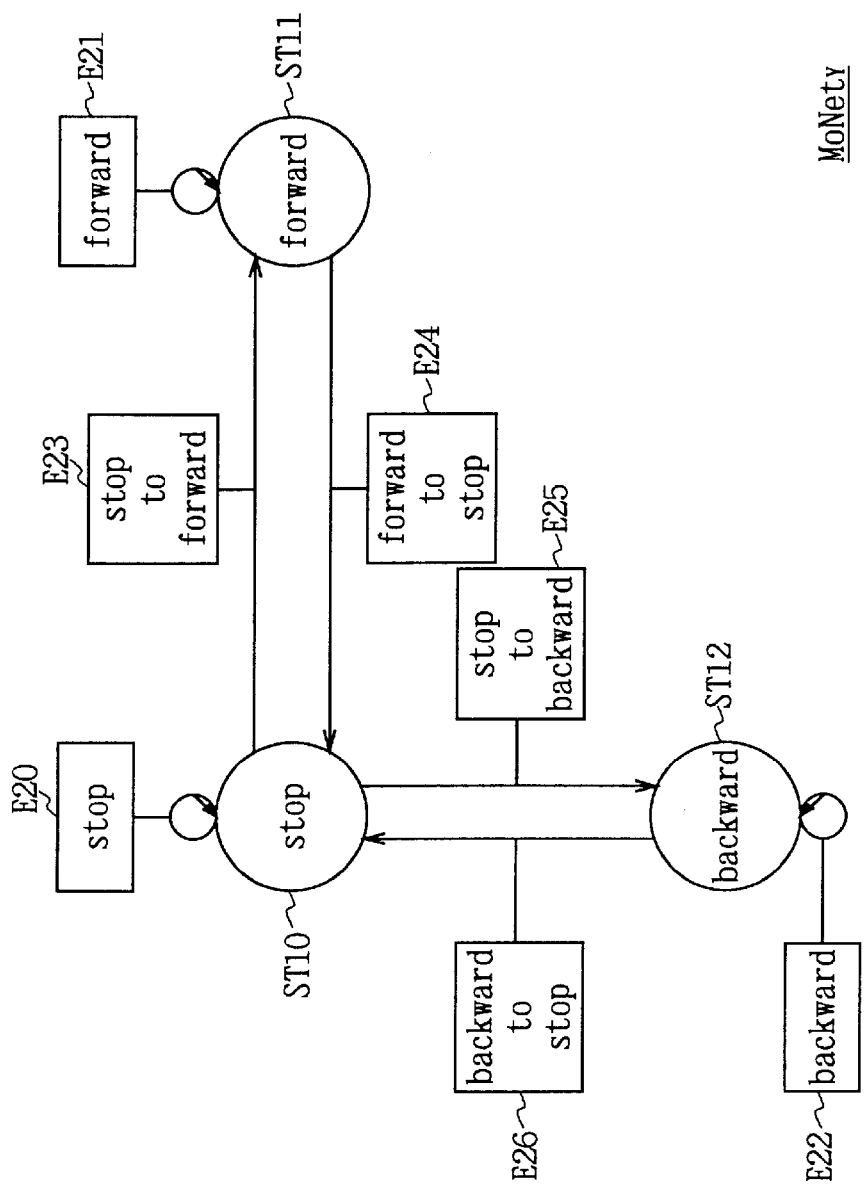
FIG. 8 is a conceptual diagram showing a motion network of a two-wheel driven robot.

The graphic construction of motion network MoNet$_x$ of a four-foot walking type robot is shown in FIG. 7, and the graphic construction of motion network MoNet$_y$ of a two-wheel driven type robot is shown in FIG. 8.

As it is clear from FIG. 7, the motion network MoNet$_x$ of the four-foot walking robot consists of five Nodes ST1 to ST5, "sleeping", "sitting", "standing", "forward walking" and "backward walking", and transitional Node-to-Nodes ST1 to ST5 are connected by edges (up and down pointing arrows).

Furthermore, programs E1 to E5 for generating the motion at Nodes ST1 to ST5 are correlated to respective nodes ST1 to ST5 and simultaneously, programs E6 to E13 for generating the motion required in the case of condition transition are correlated to respective edges. The programs E6 to E13 for generating the motion required in the case of this condition transition are programs including the control algorithm, and the control to be required in the case of each condition transition is supplied from these programs.

In this connection, the motion network MoNet$_y$ of two-wheel driven robot (FIG. 8) has approximately the same construction as the motion network MoNet$_x$ of four-foot walking robot except that it does not have Nodes ST1 and ST2, "sleeping" and "sitting".

Furthermore, FIGS. 9A and 9B show conversion data CC$_x$ and CC$_y$ of the four-foot walking robot and the two-wheel driven robot respectively. As it is clear from FIGS. 9A and 9B, in the four-foot walking robot, commands to be given from the upper level program, "Move forward", "Move backward", "Stay", "Rest" and "Sleep" are converted into commands, "forward waking", "backward walking", "standing", "sitting" and "sleeping" respectively.

Moreover, in the two-wheel driven robot, commands "Move forward", "Move backward", "Stay", "Rest" and "Sleep" are converted into commands, "forward", "backward", "stop", "stop" and "stop" respectively.

(2-3) Operation and Effects of the Second Embodiment

According to the foregoing construction, the CPU 53 of the body unit 31 recognizes the configuration of the assembled robot 30 based on the geometry information stored in memories 54, 52 of respective component units 31 to 41, and judges the category of the robot 30 based on the recognition result and the tree-structured data of each category stored in the ROM 50. Moreover, the CPU 53, by drive-controlling the actuator of each of the component units 32 to 41 based on this judgment result and various programs for action for each category, which is stored in the ROM 50, makes the whole robot 30 perform the action corresponding to the assembled configuration.

Accordingly, the robot 30 itself can recognize its own configuration at the time of the power-on even if the user does not inform the CPU 53 of the assembled configuration of the robot 30 and thus, the assembly work can be simplified.

Moreover, in the case of the robot 30, since each of the component units 31 to 41 can be used as the task other than preset task (e.g., the component units 32 to 39 which has been used as "foot" can be used as "finger") because the task information is not stored in the memory of each of the component units 31 to 41 as shown in the first embodiment, flexibility of each of the component units 31 to 41 can be improved as compared with the first embodiment.

According to the foregoing construction, the CPU 53 recognizes the configuration of the assembled robot 30 based on the geometry information stored in the memory 54, 52 of each of the component units 31 to 41, judges the category of the robot 30 based on the tree-structured data of each category stored in the ROM 50, and further drive-controls the actuators of required component units 32 to 41 when required based on this judgment result and various programs for action for each category, which are stored in the ROM 50. Therefore, the robot 30 can recognize its own configuration automatically and can act accordingly and thus, the robot capable of simplifying the assembly work can be realized.

(3) Other Embodiments

Note that, in the first embodiment, memories 23 and 25 are provided in respective component units 2 to 12 as the memory means for memorizing task information on tasks of respective component units 2 to 12. However, the present invention is not limited thereto but various other memory means such as a disc-shaped recording medium and a tape recording medium can be widely applied.

Moreover, in the first embodiment, the CPU 20 for controlling the whole robot system 1 is used as the recognition means for reading out the task information of the component unit 2 to 12 from the memories 23, 25 of the component units respectively in order to recognize the task of the component units 2 to 12 based on respective task information read out. However, the present invention is not limited thereto but the recognition means for recognizing the tasks of the component units 2 to 12 can be provided separately from the CPU 20 for controlling the whole robot 1. As the construction of the recognition means, various other constructions can be widely applied.

Furthermore, in the first embodiment, the program for generating a variety of actions is stored in the ROM 19 of the body unit 2. However, the present invention is not limited thereto but a program for generating actions for the case where the operation command to drive the component unit in the prescribed condition is given from the outside can be stored in memories 23, 25 of respective component units 2 to 12. Then, the CPU 20 can read out this program at power-on or at the other timing, and form a control signal to drive-control the pertinent component units 2 to 12 for the case where the operation command to drive the component units 2 to 12 having the predetermined task in the predetermined condition is given, based on the program read out and the task recognition result of each component unit 2 to 12, in order to drive-control the actuators of the pertinent component unit 2 to 12 based on the control signal.

Furthermore, in the first embodiment, the CPU 20 recognizes the configuration of the assembled robot 1 based on the geometry information of each of the component units 2 to 12. However, as a method of recognizing, the robot configuration can be recognized according to the tree structure of the robot 1 assembled in the way of the second embodiment.

Moreover, in the second embodiment, the CPU 53 for controlling the whole robot 30 is applied as the linkage condition detection means for detecting the linkage condition (tree structure) of each of the component units 31 to 41. However, the present invention is not limited thereto but the linkage condition detection means can be provided separately from the CPU 53 for controlling the whole robot 30.

Furthermore, in the second embodiment, the ROM 50 is applied as the memory means for memorizing the linkage condition of each of the component units 31 to 41 for each category, of which the configuration of robot system to be assembled is classified into multiple categories according to the linkage condition of each of the component unit 31 to 41. However, the present invention is not limited thereto but as the memory means, various other memory means such as a disc recording medium or a tape recording medium ca be widely applied.

Moreover, in the second embodiment, the CPU 53 for controlling the whole robot 30 is applied as the judgment means for judging to which category the assembled robot 30 belongs, based on the detected linkage condition of each of the component units 31 to 41 and the linkage condition of each of the component units 31 to 41 for each category, which is stored in the ROM 50 in advance. However, the present invention is not only limited thereto but also the judgment means can be provided separately from the CPU 53 for controlling the whole robot 30.

Furthermore, in the second embodiment, the configuration of the robot 30 to be assembled is classified into categories according to the initial condition and the tree structure. However, the present invention is not limited thereto but, in short, if the configuration of the robot 30 to be assembled is classified into categories according to, at least, the tree structure, various other methods can be widely applied as the more detailed classification method.

Furthermore, in the second embodiment, the gravity sensor is installed in the body unit 31 and the CPU 53 judges the category of the configuration of robot 30 based on the output of the gravity sensor. However, the present invention is not limited thereto but, by providing setting means, such as a switch, capable of input-setting the configuration type of the assembled robot (two-foot walking type, four-foot walking type, vehicle wheel type, two-wheel driven type) in the robot 30, the CPU 53 can identify the category of configuration of the robot 30 based on the setting inputted by the user via the setting means.

Moreover, a ground sensor can be provided in each of the component units 31 to 41 in place of the gravity sensor in order to identify the category of the configuration of the assembled robot 31 based on which part of which component unit 31 to 41 is grounded in the initial condition based on the output of the ground sensor. As the method of identifying the initial condition, various other methods can be widely applied.

Furthermore in the aforementioned second embodiment, the CPU 53 identifies the category of the robot 30 based on the posture of the robot 30 at power-on. However, the present invention is not limited thereto but the CPU 53 can identify the category of the robot 30 based on the posture of the robot 30 at the timing other than at the power-on.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A robot apparatus comprising:
   a plurality of component units connected to the body of said robot apparatus via HUBs;
   linkage state detection means for detecting the state of linkage of said component units in terms of tree structure data which defines said state of linkage;
   memory means for storing a plurality of types of tree structure data representing a plurality of categories which correspond to a plurality of linkage states of the robot, and storing also a plurality of operation control programs that correspond to said plurality of categories, for controlling operations of said component units;
   category determination means for determining the category of the linkage state of said robot apparatus by comparing the result of the detection of the linkage state performed by said linkage state detection means with the linkage states of different categories stored in said memory means; and
   control means for controlling operations of said plurality of component units based on said operation control program selected according to the category determined by said determination means from among the plurality of operation control programs stored in said memory means.

2. The robot apparatus according to claim 1, wherein said tree structure data includes branching information of said component units.

3. The robot apparatus according to claim 1, wherein:
   said memory means stores multiple programs to generate basic operations in every category; and
   said category determination means forms a control signal for drive-controlling said each component unit based on the determined category said robot apparatus assembled belongs and a respective program stored in said memory means.

4. The robot apparatus according to claim 1, comprising a gravity sensor for detecting the direction of gravity, and wherein:
   the configuration of said robot apparatus to be assembled is classified into multiple categories according to said linkage state of said each component unit and a posture of said robot apparatus at an initial setting; and
   said category determination means determines which category said robot apparatus assembled belongs, based on the detection result of said gravity sensor and said linkage state of said each component unit for every category stored by said memory means.

5. The robot apparatus according to claim 4, comprising setting means for setting a posture of said robot apparatus assembled to an initial posture.

6. A robot system driving method for drive-controlling a robot to be assembled by connecting a plurality of component units to a body via HUBs, comprising the steps of:
   detecting a linkage state of said each component unit in terms of tree structure data;
   storing a plurality of types of tree structure data representing a plurality of categories which correspond to a plurality of linkage states of the robot, and storing also a plurality of operation control programs that correspond to said plurality of categories, for controlling operations of said component units;
   determining the category of the linkage state of said robot apparatus by comparing the result of the detection of the linkage state with the linkage states of different categories stored in a memory means; and
   drive-controlling said each component unit based on said operation control program selected according to the determined category from among the plurality of operation control programs.

7. A robot apparatus comprising:
   a plurality of component units connected to the body of said robot apparatus via HUBs;
   a linkage state detector for detecting the state of linkage of said component units in terms of tree structure data which defines said state of linkage;

a memory for storing a plurality of types of tree structure data representing a plurality of categories which correspond to a plurality of linkage states of the robot, and storing also a plurality of opertaion control programs that correspond to said plurality of categories, for controlling operations of said component units;

a category determination unit for determining the category of the linkage state of said robot apparatus by comparing the result of the detection of the linkage state performed by said linkage state detector with the linkage states of different categories stored in said memory; and a control unit for controlling operations of said plurality of component units based on said operation control program selected according to the category determined by said determination unit from among the plurality of operation control programs stored in said memory.

8. The robot apparatus according to claim 7, wherein said tree structure data includes branching information of said component units.

9. The robot apparatus according to claim 7, wherein:

said memory unit stores multiple programs to generate basic operations in every category; and said category determination unit forms a control signal for drive-controlling said each component unit based on the determined category said robot apparatus assembled belongs and a respective program stored in said memory.

10. The robot apparatus according to claim 7, comprising a gravity sensor for detecting the direction of gravity, and wherein:

the configuration of said robot apparatus to be assembled is classified into multiple categories according to said linkage state of said each component unit and a posture of said robot apparatus at an initial setting; and said category determination unit determines which category said robot apparatus assembled belongs, based on the detection result of said gravity sensor and said linkage state of said each component unit for every category stored by said memory.

11. The robot apparatus according to claim 10, comprising setting unit for setting a posture of said robot apparatus assembled to an initial posture.

* * * * *